Dec. 21, 1926.
L. TRUDEAU ET AL
1,611,257
REPEATING ATTACHMENT FOR PHONOGRAPHS
Filed July 23, 1925    2 Sheets-Sheet 1
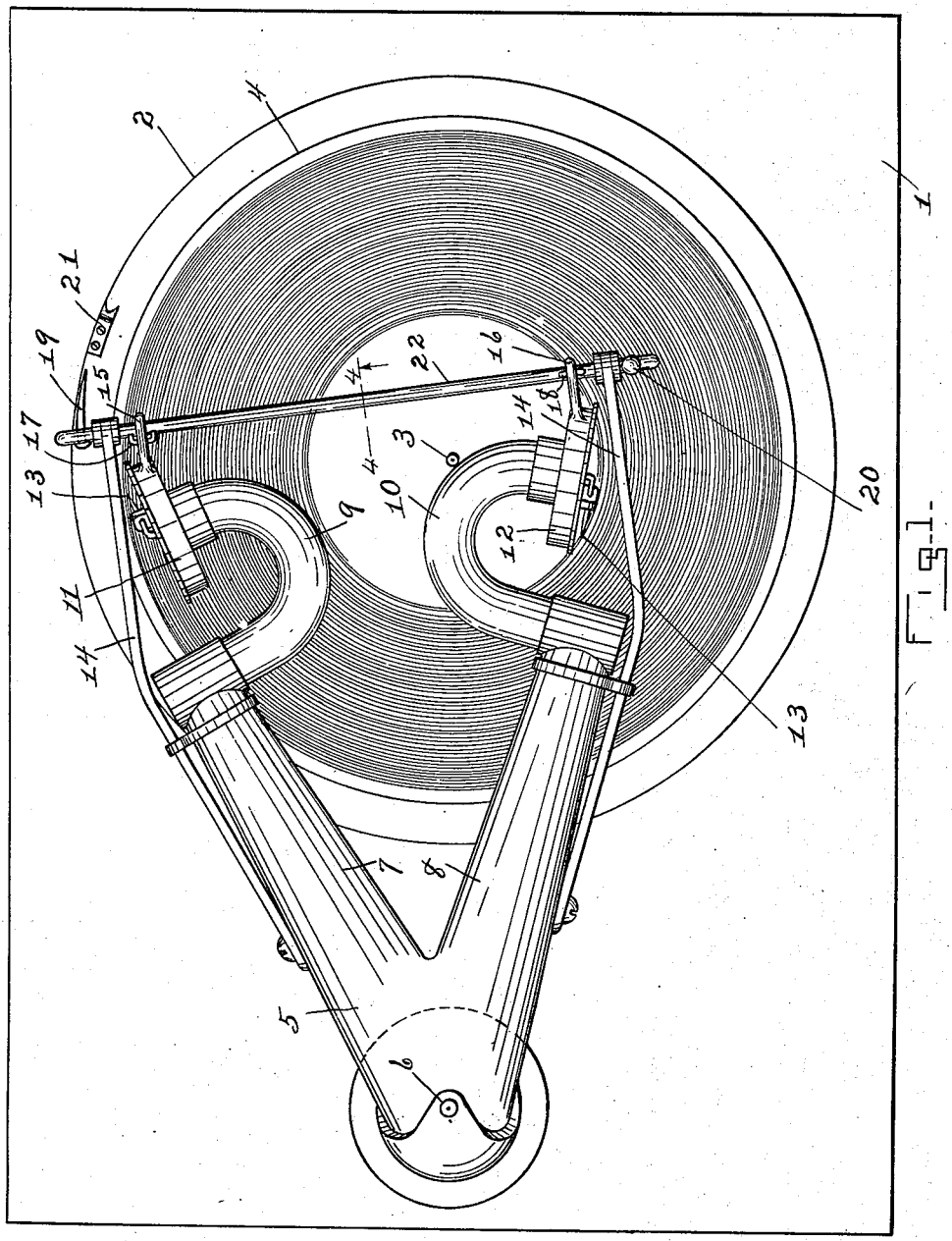
Inventors:
Louis Trudeau
& Lewis Daniels,
By Frank R. Curtis
Attorney

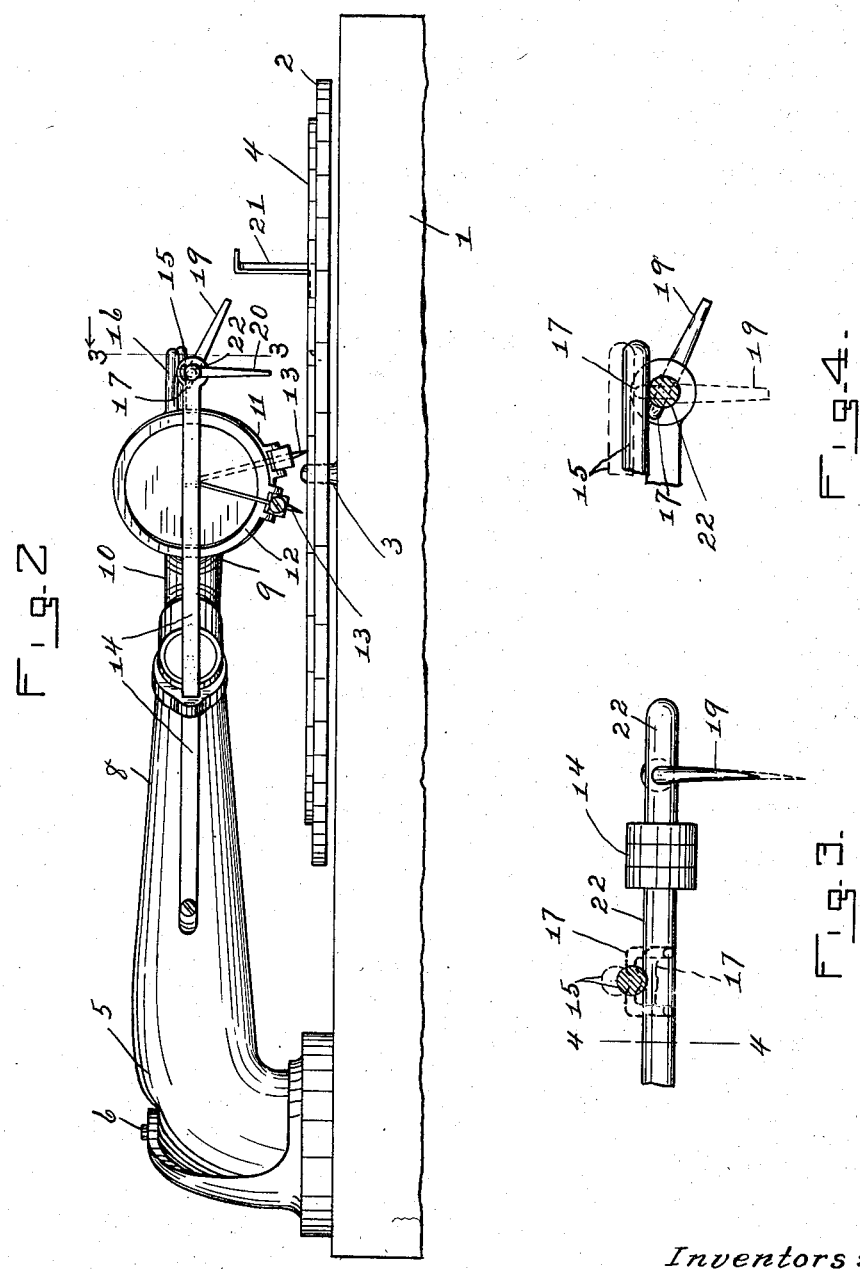

Patented Dec. 21, 1926.

1,611,257

UNITED STATES PATENT OFFICE.

LOUIS TRUDEAU AND LEWIS DANIELS, OF PITTSFIELD, MASSACHUSETTS.

REPEATING ATTACHMENT FOR PHONOGRAPHS.

Application filed July 23, 1925. Serial No. 45,528.

Reference may be had to the accompanying drawings and the reference characters marked thereon, which form a part of this specification. Similar characters refer to similar parts in the several figures therein.

The principal object of the invention is to provide a simple mechanism whereby a phonograph can be automatically caused to repeat the playing of a record without undue strain on the needle or the record.

Other objects of the invention will appear in connection with the following description.

Fig. 1 of the drawings is a top plan view of a phonograph embodying our invention.

Fig. 2 is a view in side elevation of the same.

Fig. 3 is a cross-section taken on the broken line in 3—3 in Fig. 2, through one of the goose-neck-raising arms showing in side elevation a broken-away portion of a rock-shaft which carries the cams for raising the goose-necks and the trip-engaged members, whereby said shaft is rocked.

Fig. 4 is a cross-section of the same taken on the broken line 4—4 in Figs. 1 and 3.

Referring to the drawings, wherein the invention is shown in preferred form, 1 is the box or body of the phonograph upon which is rotatively mounted the usual turntable, 2, having a central spindle or pin, 3, upon which is mounted the record, 4, to rotate with the turntable.

In carrying out our invention, we employ a tone-arm, 5, oscillatory upon a vertical axis, 6, outside of the turntable and having two arms or branches, 7 and 8, each having a goose-neck, 9 or 10, mounted thereon to oscillate vertically.

The goose-necks are provided with the respective sound-boxes, 11, 12, each having a needle, 13, adapted to traverse the sound-groove in the record, 4.

The angular arrangement of the tone-arm members, 7, and 8, is such that the sound-boxes are spaced apart a distance substantially equal to the width of the sound-groove-zone of the record to be played.

The pivotal mounting of the tone-arm, 5, permits the tone-arm to be oscillated to cause the respective sound-boxes to travel across said sound-groove-zone, one on one side, and the other on the opposite side, of the axis of the record.

A rock-shaft, 22, is rockably mounted in bearings in the outer ends of brackets, 14, fixed upon the respective members, 7 and 8, of the tone-arm, which shaft extends transversely of a line passing through the axis of the turntable and the axis of oscillation of the tone-arm.

Arms, 15 and 16, project from the respective goose-necks over the shaft, 22, and directly beneath said arms said shaft is provided with cams or tappets, 17, 18, adapted, when rocking movements are imparted to said shaft, to engage and raise the respective goose-necks through said arms.

The arms, 15 and 16, are shown projecting from the respective sound-boxes; but they may project from any part of the respective goose-necks, whereby the sound-boxes can be raised sufficiently to withdraw their respective needles from engagement with the record.

Fixed upon the opposite ends of the shaft 22, are two rocker-arms, 19, 20, adapted to be carried by the oscillating movements of the tone arm in alternation into the path of a trip, 21, carried by the turntable.

The rocker-arms, 19, 20, are so arranged that the arm, 19, is in position to be engaged by the trip at the end of the movement of the tone-arm caused by the engagement of the needle of sound-box, 12, with the record, 4; and that the arm, 20, is in position to be engaged by the trip at the end of the movement of the tone-arm caused by the engagement of the needle of sound-box, 11, with the record.

The arms, 19, 20, and the cams or tappets, 17, 18, are so angularly arranged with respect to the shaft, 22, that a trip-induced movement of the shaft caused by engagement of the trip with the arm, 19, will cause the cam or tappet, 18, to raise the goose-neck, 10, while withdrawing the tappet, 17, from supporting engagement with the arm, 15, of goose-neck, 9, thus withdrawing the needle of sound-box, 12, from engagement with the record, and permitting the needle of sound-box, 11, to automatically engage the record; and in the same way a trip-induced movement of the shaft 22, caused by engagement of the trip with the arm, 20, will cause the cam or tappet, 17, to raise the goose-neck, 9, while withdrawing the tappet, 18, from supporting engagement with the arm, 16, of goose-neck, 10, thus withdrawing the needle of the sound-box, 11, from engagement with the record, and permitting the needle of sound-box, 12, to automatically engage the record.

Each needle is thus permitted to engage the record at the beginning of the sound-groove; and each needle is thus raised away from the record at the end of the sound-groove.

As the arms, 19, 20, are on opposite sides of the axis of the turntable, engagement of the trip with the respective arms will move the shaft, 22, in opposite directions.

The operation of the machine is as follows:

The shaft, 22, is rocked or moved to cause one of the tappets, 17, 18, to engage the neighboring arm, 15, or 16, and support the neighboring goose-neck and its sound-box in raised position with its needle withdrawn from the record. In this position of the shaft, 22, the other tappet is withdrawn from position to support the other arm, 15, or 16, so the operator holds the other sound-box in raised position with its needle out of engagement with the record, and swings the tone-arm to one side to bring this needle into line with the beginning of the sound-groove.

He then lowers the hand-supported sound-box to permit its needle to engage the record, and the playing of the record then proceeds in the usual manner, the engagement of the needle with the groove in the record serving to cause the operating sound-box to cross the sound-groove-zone in an inward direction, and the other sound-box which is not operating to cross said zone in an outward direction.

As the record-engaged needle reaches the end of the sound-groove, the arm, 19 or 20, on the farther end of the shaft, 22, is brought into the path of the trip, 21, causing the shaft to be rotatively moved to bring the disengaged tappet into engagement with the arm, 15 or 16, of the operating sound-box to raise the same and withdraw its needle from engagement with the record, and at the same time to withdraw the other tappet from supporting engagement with the arm, 15 or 16, of the other sound-box the needle of which is thus permitted to automatically engage the record at the beginning of the sound-groove.

The repeated playing of the record then proceeds, the tone-arm being swung in the opposite direction by the engagement of the needle with the tone-groove.

The playing of the record may thus be repeated indefinitely so long as the turntable continues to rotate.

The strain of raising the goose-necks falls upon the turntable and its operating mechanism, the engagement of the needles with the sound-groove serving merely to bring the arms, 19, 20, into position to be engaged by the trip.

In Fig. 1, the parts are shown in a position which they occupy just after the arm, 19, has been acted upon by the trip, 21, to raise the goose-neck, 10, to bring the needle of sound-box, 12, out of engagement with the record, and to lower the goose-neck, 9, to bring the needle of sound-box, 11, into engagement with the record.

From this position, the sound-box, 11, gradually travels toward the center of the record while the sound-box, 12, travels away from the center of the record.

This movement continues until the relative position of the two sound-boxes is reversed with respect to the center of the record from the position shown in Fig. 1, and the arm, 20, is brought into the path of the trip, 21.

In Fig. 2, the parts are shown as they appear when the tone-arm is in mid-position.

We do not wish to be limited to the constructions shown and above described, as for certain purposes of the invention, various changes may be made in the form and arrangement of various parts of the device without departing from the spirit of the invention.

What we claim as new and desire to secure by Letters Patent is—

1. In a phonograph and in combination, a turntable; a trip carried by the turntable outside the record area; an oscillatory tone-arm having two goose-necks supporting two sound-boxes on opposite sides of a line passing through the axis of the turntable and the axis of oscillation of the tone-arm; goose-neck-raising mechanism carried by the tone-arm including alternately operating members for raising and supporting in raised position the respective goose-necks, and members operated by translational movement of the trip for actuating the respective goose-neck-raising members, said trip-operated members being carried by oscillating movement of the tone-arm alternately into the path of the trip, one at the end of the movement of the tone-arm in one direction, and the other at the end of the movement of the tone-arm in the opposite direction, said goose-neck-raising members serving each to support its respective goose-neck in raised position until the other is actuated by its trip-operated member returnable to record-reproducing position when released by the respective raising members.

2. In a phonograph and in combination, a turntable; a trip carried by the turntable outside the record area; a tone-arm having two goose-necks; two sound-boxes mounted on the respective goose-necks at a distance apart approximately equal to the width of the tone-groove-zone on a talking machine record; a cross-shaft rockably mounted upon the tone-arm transversely of a line passing through the axis of the turntable and the axis of oscillation of the tone-arm, and having on opposite sides of said line two arms movable by rocking movement of said shaft, one into the path of said trip at one end of the sound-groove-induced movement of the tone-arm, and the other into the path of said trip at the other end of the sound-groove-induced movement of the tone-arm; a lifting arm for each goose-neck projecting over said shaft; and tappets projecting from said shaft at different angles engageable with the respective goose-neck-lifting arms by trip-induced rocking movements of said shaft.

In testimony whereof, we have hereunto set our hands this ninth day of July, 1925.

LOUIS TRUDEAU.
LEWIS DANIELS.